W. N. SHANNON.
AUTOMOBILE FRAME EXTENSION.
APPLICATION FILED MAY 24, 1917.
1,250,677.
Patented Dec. 18, 1917.
2 SHEETS—SHEET 2.
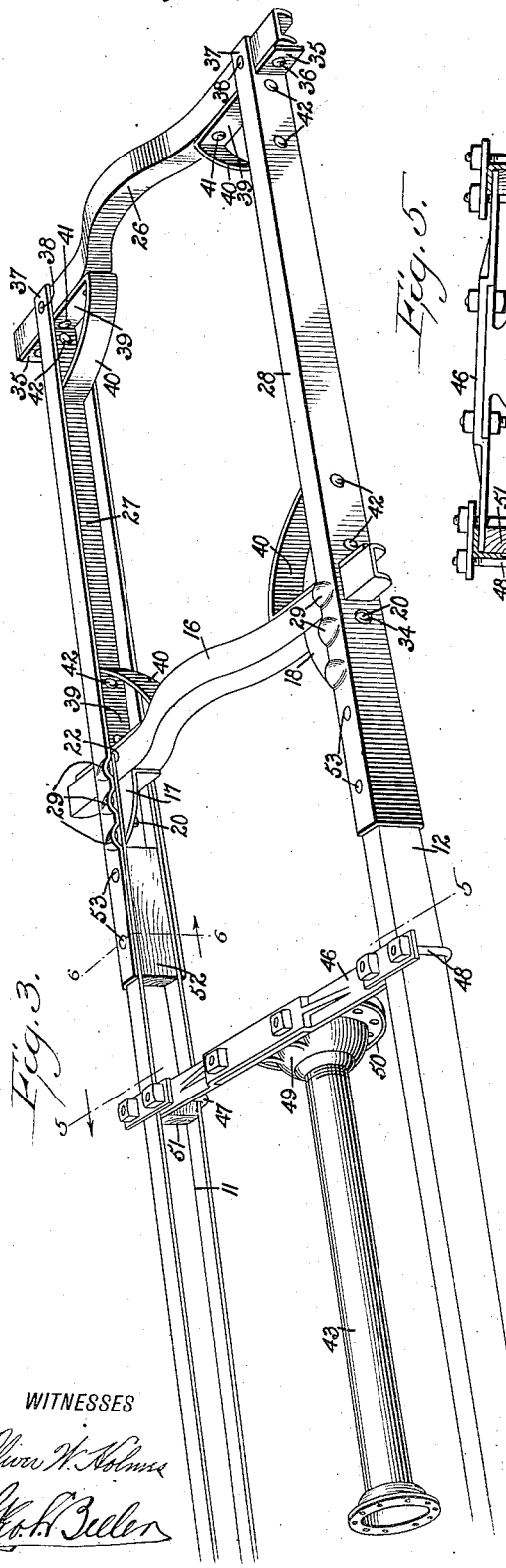
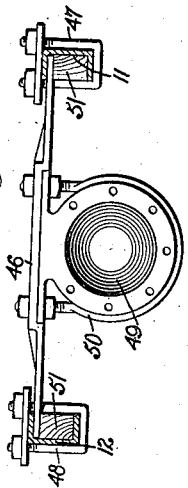
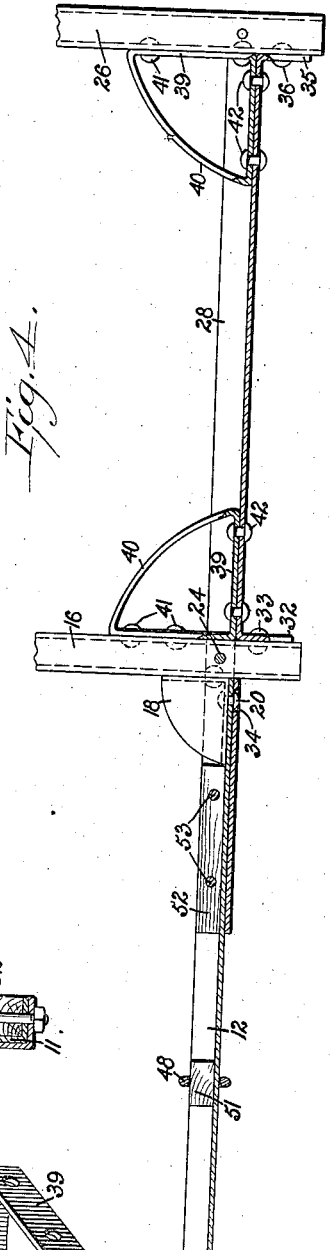
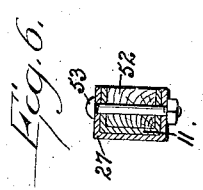
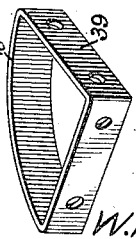
WITNESSES
INVENTOR
W. N. Shannon
BY
ATTORNEYS

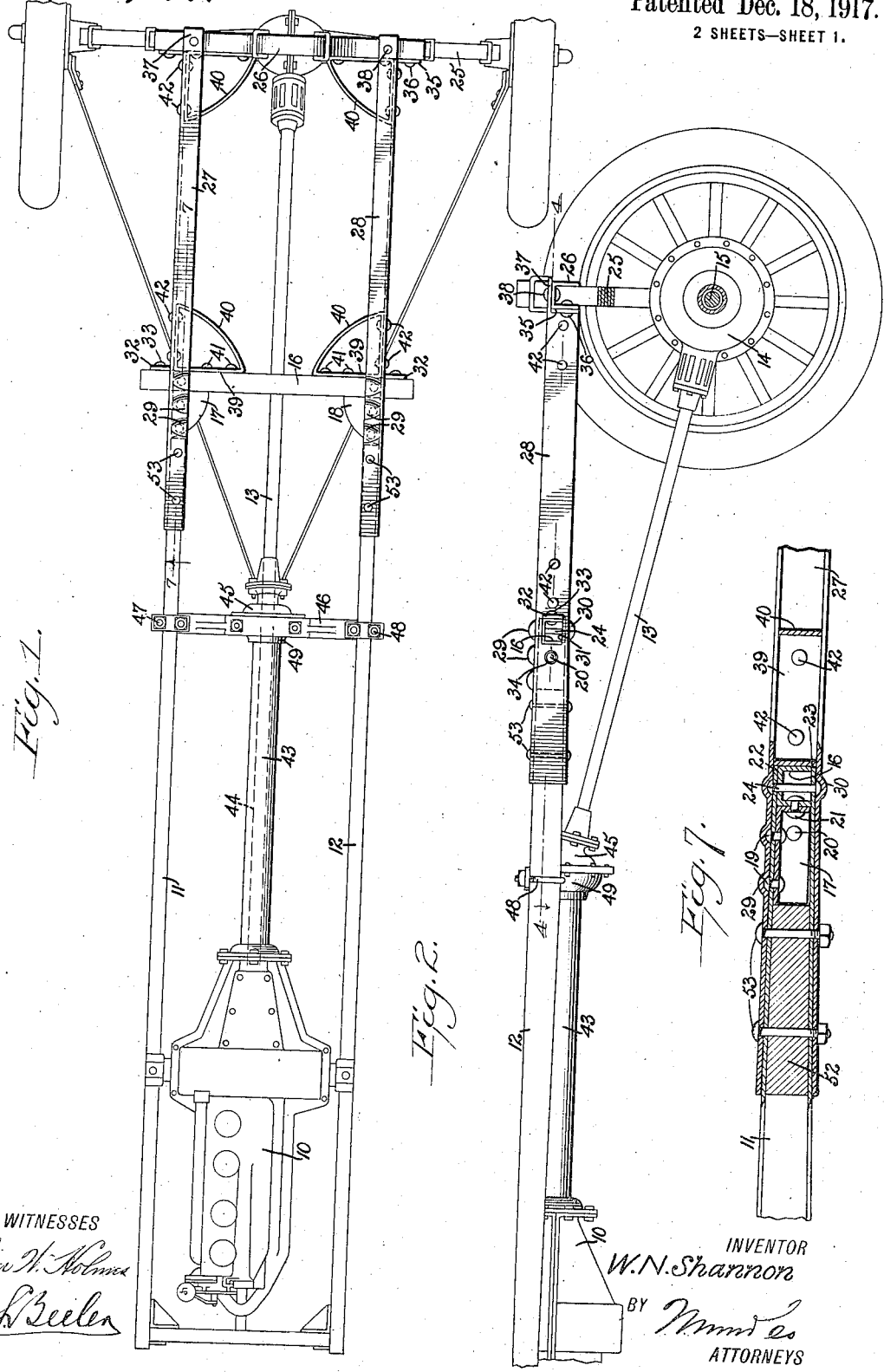

UNITED STATES PATENT OFFICE.

WILLIAM N. SHANNON, OF BROOKLYN, NEW YORK.

AUTOMOBILE-FRAME EXTENSION.

1,250,677.  Specification of Letters Patent.  Patented Dec. 18, 1917.

Application filed May 24, 1917. Serial No. 170,670.

*To all whom it may concern:*

Be it known that I, WILLIAM N. SHANNON, a citizen of the United States, and a resident of the city of New York, borough of Brooklyn, in the county of Kings and State of New York, have invented a new and useful Improvement in Automobile-Frame Extensions, of which the following is a full, clear, and exact description.

This invention relates to automobiles and has particular reference to the means for transforming an ordinary pleasure vehicle of standard type into a commercial vehicle with an extended frame or chassis.

Among the objects of the invention therefore is to provide improved facilities of a simple, reliable and easily manipulated nature adapted to extend a standard automobile frame so as to support a longer body instead of an ordinary short body, for commercial purposes.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of the principal parts of an automobile chassis with my improvement incorporated therein, the improved parts being shown in heavy lines while the standard or old parts are shown in light lines.

Fig. 2 is a side elevation of the rear portion shown in Fig. 1.

Fig. 3 is a detail perspective view of the rear portion of the frame.

Fig. 4 is a horizontal sectional detail on the line 4—4 of Fig. 2.

Fig. 5 is a vertical transverse section on the line 5—5 of Fig. 3 looking forward.

Fig. 6 is a vertical transverse section on the line 6—6 of Fig. 3.

Fig. 7 is a vertical longitudinal section on the line 7—7 of Fig. 1; and

Fig. 8 is a detail perspective view of one of my improved frame corner brackets.

Referring now more particularly to the drawings I show an engine 10 supported upon a frame including side bars 11 and 12 and adapted to be connected through a rod or shaft 13 with the differential 14 of the rear axle 15 supporting ordinarily a crossbar 16 secured rigidly and permanently to the rear ends of the side bars 11 and 12.

In the well known type of automobile the crossbar 16 is secured to the rear ends of the side bars 11 and 12 by means including a pair of corner brackets 17 and 18 each connected to its side bar by rivets 19 or their equivalent, extending through the upper flange of such bar, and a rivet 20 or its equivalent, passing laterally through the main web of the side bar. Each of these brackets furthermore is secured to the adjacent portion of the crossbar 16 by means of a permanent rivet 21 or its equivalent, the axis of the rivet being longitudinal of the machine. The upper flange of each side bar is extended rearwardly as indicated at 22 to overlie the top of the crossbar while the lower flange is similarly projected beneath the crossbar as indicated at 23. A vertical fastener 24 passes through both of these bar extensions and the crossbar. This crossbar 16 is of arched channel construction and is calculated to receive the upper portion of the rear spring 25, the ends of the crossbar projecting laterally beyond the side bars 11 and 12.

In carrying out my invention in a practical form I employ an auxiliary crossbar 26 constituting a substantial duplication of the standard bar 16 which will receive the spring 25 when it is removed from the bar 16 and assembled in its rearwardly extended position for the connection of the rear axle and driving devices.

My frame extension proper comprises side bars 27 and 28 of peculiar construction and adapted to be connected to the rear ends of the corresponding side bars 11 and 12 without material alteration and with the minimum amount of labor. Each of these extension bars 27 and 28 is of channel construction with its web portion vertical and on the outside, while its upper and lower flanges extend inwardly in horizontal planes. The front end of each bar is flared toward the front to fit exactly over the tapered rear end of the adjacent standard bar, the upper flange of the extension bar being provided with a series of swells or convexities 29 to take over the heads of the rivets 19 and 24 without obstruction, and the lower flange is provided with a downward convexity or swell 30 to take over the lower end of the rivet 24 so that the rear end of the standard side bar is snugly embraced by the flaring front end of its extension bar. The web portion of the extension is provided with a cut-out or hole 31 formed by striking out a lip 32 at rightangles to the main portion of the web. This hole allows the extension bar to take directly over the outer free end of the crossbar 16 so that the lip 32 will lie squarely against the rear face of the bar 16 to which it is fastened by means of a rivet 33 or its equivalent. In front of the projecting end of the crossbar 16 the web of the extension bar may be provided with a hole 34 to accommodate the head of the fastener 20.

The rear end of each extension bar is strongly secured to the adjacent end of the auxiliary bar 26 by means including a lip 35 bent outwardly from the rear end of the web and fastened to the front flange of the bar 26 by means of a rivet 36. The top flange of the same extension bar is thus adapted to lie upon the top of the auxiliary bar as indicated at 37 where it is fastened by a fastener 38.

This rear portion of the frame comprised by two extension bars 27 and 28 and the crossbars 16 and 26, which is substantially rectangular in plan, has each corner thereof braced in a peculiarly strong manner by means of a novel form of corner bracket designed by me and comprising an endless device including a rightangular portion 39 and an arc-shaped connection 40 opposite the rightangle. The rightangular portion of each bracket is fitted squarely against one of the vertical flanges of a crossbar by fasteners 41 and upon the inner face of the web portion of the side bar extension by means of fasteners 42. The outward or convex form of the connection 40 adapts itself to accommodate the introduction of these several fasteners.

With the frame constructed as indicated the adaptation of the driving connections thereto is comparatively simple. Referring now to Figs. 1 and 2 it will be appreciated that in order to employ the same shaft 13 and in practically the same relation to the differential and the driving device is in its original position, I provide a rearwardly extending horizontal shaft casing 43 adapted to house a short section of the shaft 44 to make connection with the universal joint at 45. The casing 43 is supported at its rear end by a hanger bar 46 having its ends secured to the side bars 11 and 12 by U-bolts 47 and 48 respectively. The rear hemispherical socket piece 49 of the casing is embraced by a stirrup 50 extending outwardly through the hanger bar. The channel members 11 and 12 at the region of the U-bolts 47 and 48 may be provided with filler blocks 51 made of wood or the like to increase the stability of this part of the structure. The same is true also at 52 where the flaring front ends of the extension bars embrace the rear ends of the standard side bars 11 and 12, these latter blocks 52 being secured by vertical bolts 53 which pass through the horizontal flange portions of the overlapping bars.

I claim:

1. In an automobile frame extension, the combination with a standard frame comprising parallel side bars and a crossbar rigidly and permanently connected thereto, the rear ends of the side bars being tapered and the crossbar having its ends extending beyond the side bars, of a pair of extension bars having holes formed therethrough to receive the projecting ends of the crossbar and having the end portions thereof in front of the holes flared and embracing the tapered portions of the first mentioned bars, and means to rigidly secure the extension bars to the crossbar and the rear ends of the first mentioned bars.

2. The combination with a pair of parallel side bars, a crossbar between the same and having its ends projecting beyond the sides of the side bars and means including corner brackets and headed fasteners rigidly securing the rear ends of the side bars to the crossbar, of a pair of extension bars having their front ends embracing the rear ends of the first mentioned bars and having swells taking over the heads of said fasteners, said extension bars having lips struck out forming holes to receive the projecting ends of the crossbar, means securing said lips squarely against one side of the crossbar, and means auxiliary to said lips for securing the extension bars to said crossbar.

3. In a device of the character set forth, the combination with a pair of side bars, a crossbar extending between the same, a pair of corner brackets located at the intersection of the side bars and crossbar and headed fasteners rigidly and permanently securing the crossbar to the side bars, of a frame extension comprising a pair of extension bars embracing the rear ends of the side bars and having a plurality of convexities formed in the structure thereof to take over the heads of said fasteners without obstruction, an auxiliary crossbar extending between the rear ends of the extension bars, and a set of rigid corner pieces rigidly securing the extension bars to both of the crossbars.

4. In a device of the character set forth, the combination of a standard frame including a pair of side bars and a crossbar rigidly and permanently secured thereto, of a frame extension comprising a pair of extension bars, means connecting the front ends of the extension bars to the side bars and its crossbar, and auxiliary crossbar similar to the first mentioned crossbar, and a plurality of corner brackets rigidly and permanently securing the rear ends of the extension bars to the auxiliary crossbar, each of said brackets consisting of an endless rightangular structure having an arc-shaped brace opposite the rightangle thereof.

WILLIAM N. SHANNON.